United States Patent

Guigonis et al.

Patent Number: 6,121,177
Date of Patent: Sep. 19, 2000

[54] SINTERED MATERIALS PRODUCED FROM ZIRCON AND ZIRCONIA

[75] Inventors: Jacques Marius Louis Guigonis, Entraigues; Eric Thierry Georges Jorge, Les Valayars, both of France; Charles Nicholas McGarry, Buckhannon, W. Va.

[73] Assignee: Societe Europeenne des Produits Refractaires, Courbevoie, France

[21] Appl. No.: 09/294,145

[22] Filed: Apr. 20, 1999

[30] Foreign Application Priority Data

Apr. 22, 1998 [FR] France .................................. 98 05010

[51] Int. Cl.⁷ .................................................... C04B 35/49
[52] U.S. Cl. ......................... 501/105; 501/106; 501/107
[58] Field of Search ..................................... 501/103, 105, 501/106, 107

[56] References Cited

U.S. PATENT DOCUMENTS

| | | | |
|---|---|---|---|
| 2,553,265 | 5/1951 | Mochel ..................................... | 501/106 |
| 3,228,778 | 1/1966 | Walther et al. . | |
| 3,437,499 | 4/1969 | Horak et al. ............................. | 501/107 |
| 3,519,448 | 7/1970 | Alper et al. . | |
| 4,336,339 | 6/1982 | Okumiya et al. ........................ | 501/105 |
| 4,342,597 | 8/1982 | Brown ...................................... | 501/107 |
| 4,579,829 | 4/1986 | Garvie ..................................... | 501/106 |
| 5,679,612 | 10/1997 | Endo et al. ............................. | 501/105 |

FOREIGN PATENT DOCUMENTS

| | | |
|---|---|---|
| 122 677 | 10/1976 | Germany . |
| 52-117911 | 10/1977 | Japan . |
| 91 03439 | 3/1991 | WIPO . |

*Primary Examiner*—Mark L. Bell
*Assistant Examiner*—David Sample
*Attorney, Agent, or Firm*—Young & Thompson

[57] ABSTRACT

The invention relates to a novel sintered material, characterized in that it is produced from a batch containing 5 to 40% zircon and in that it has the following chemical composition in % by weight:

| | |
|---|---|
| $ZrO_2 + HfO_2$ | 82–96 |
| $SiO_2$ | 1.7–14 |
| $TiO_2$ | 0.2–3 |
| $Y_2O_3$ | 0.4–5 |
| $Al_2O_3$ | 0.2–2.5 |
| Others | <1 |

9 Claims, No Drawings

SINTERED MATERIALS PRODUCED FROM ZIRCON AND ZIRCONIA

FIELD OF THE INVENTION

The invention relates to novel sintered materials produced from zircon and zirconia.

BACKGROUND OF THE INVENTION

Initially, sintered products produced from zircon and zirconia were essentially used as hearth sublayers for glass furnaces because their corrosion resistance was insufficient to be used directly in contact with glass.

Increasingly, these products are tending to be used in contact with glass; they have in fact a lower corrosion resistance than products based on chromium oxide, but they do not present a risk of colouring the glass.

U.S. Pat. No. 5,124,287, assigned to Corhart Refractories Corporation, describes dense zircon-based products that are improved as they are resistant to thermal shock and can be more easily used in contact with glass. These products essentially consist of zircon and of small additions of zirconia and titanium oxide. The authors mention contents of zirconia ranging from 5 to 25% introduced into the composition. The examples show that, for products containing more than 25% zirconia, cracks appear when firing the blocks and this even occurs in the case of small blocks having a mass of less than 10 kg. This patent mentions that if other compounds are present they must preferably represent less than 2% by weight if it desired to maintain a corrosion resistance level identical to that of products essentially consisting of dense zircon. The authors also point out that excessively high percentages of zirconia would result in high costs and a tendency to cause stoning. Moreover, it is mentioned that it is preferable to use monoclinic zirconia, and therefore to avoid the presence of stabilizers such as yttrium oxide.

Corhart currently sells a product of the type described in the abovementioned patent under the name ZS-1300; it is this product that is mostly used in bottoms of bottom-electrode furnaces.

Other products produced from zircon and zirconia have been described in the literature. Many of these are intended to be used in contact with molten metal. For this application, the constraints are different from those encountered in glassmaking. This is because, in metallurgy, the temperatures at which refractory blocks are used are different from those encountered in glassmaking. In addition, in metallurgy it is possible to use, without any particular problem, zirconia stabilizers such as MgO or CaO. However, in glassmaking, these stabilizers are unsuitable when the refractory blocks are in contact with any vapour emitted by the glass (as in the case of glass feeders). This is because such vapour damages the refractory block and cracks form. This may result in the product crumbling and therefore causing stoning in the glass, this being synonymous with defects. However, any defect in the glass, particularly in glass for reinforcing fibres, in unacceptable.

In glassmaking, there is presently a need for a more resistant material, particularly for electrode-supporting blocks in bottoms and in feeders for furnaces making glass for reinforcing fibres. These materials, in addition to improved corrosion resistance, must satisfy other criteria. First of all, their industrial feasibility must be guaranteed. "Industrial feasibility" should be understood to mean the possibility of obtaining large crack-free blocks since, in the construction of glass furnaces, the blocks are of large size; yet, the greater the size of the pieces, the higher the stresses and therefore the higher the risk of cracking after firing. Thus, the possibility of producing crack-free blocks with a mass of greater than 10 kg will be chosen as feasibility criterion. In fact, it is important to avoid the presence of cracks which would be preferred sites of corrosion. For the same reason, these products must have as low a porosity as possible. Moreover, given the low viscosity of glass for reinforcing fibres, it is necessary to ensure that the joints between blocks are sealed at the operating temperature of the furnace. Finally, it is essential to limit the costs.

The invention aims specifically to meet this need.

While seeking to obtain a product which meets the various requirements mentioned above, we have demonstrated that it is possible to obtain a more corrosion-resistant material. Unlike the teachings of U.S. Pat. No. 5,124,287, it has been found that the presence of relatively high percentages of zirconia does not result in a particular tendency to cause stoning and that the incorporation of various additives allows the various requirements mentioned above to be met.

SUMMARY OF THE INVENTION

More precisely, the invention relates to a novel sintered material, characterized in that it is produced from a batch containing 5 to 40% zircon and in that it has the following chemical composition in % by weight:

|  | Wide range | Preferred range |
| --- | --- | --- |
| $ZrO_2 + HfO_2$ | 82–96 | 87–94 |
| $SiO_2$ | 1.7–14 | 3–8 |
| $TiO_2$ | 0.2–3 | 0.4–1.5 |
| $Y_2O_3$ | 0.4–5 | 0.8–3.0 |
| $Al_2O_3$ | 0.2–2.5 | 0.5–1.0 |
| Others | <1 | <0.5 |

The invention also relates to the use of the sintered material of the invention in order to form the tank and/or a feeder of a glass furnace.

The invention further relates to a process of making a shaped body of said sintered material, which comprises the following steps:

a) preparing a sinterable batch containing 5 to 40% by weight of zircon and comprising by weight, on the oxide basis, 82–96% of $ZrO_2+HfO_2$, 1.7–14 of $SiO_2$, 0.2–3% of $TiO_2$, 0.4–5% of $Y_2O_3$, 0.2–2.5% of $Al_2O_3$, and <1 of others;

b) forming said batch into a green shape, and c) firing the resultant green shape to a temperature in the range of about 1400° C. and 1650° C. for a time sufficient to sinter it.

Preferably, the firing temperature is 1600° C. and the firing time is between 10 to 30 hours.

The sinterable batch contains 5 to 40% by weight of zircon and has a composition such that, after sintering, it gives a sintered material having the chemical composition defined for the novel sintered material of the invention. The sinterable batch can contain also any usual additives such as binders and/or lubricants, which help to form the green shape but are volatilized off during the firing step.

Preferably, the sintered material of the invention is in the form of a block weighing at least 10 kg.

Preferably, the sintered material of the invention is produced from a batch containing 10 to 20% zircon.

Since raw zirconia materials always contain small amounts of $HfO_2$, the properties of which are very similar to those of $ZrO_2$, these two oxides will not be distinguished from each other, as is the usual practice.

"Others" should be understood to mean in general oxides such as $Na_2O$, $Fe_2O_3$, $P_2O_5$, etc., and other impurities coming from the raw materials used. These "other oxides" are not necessary constituents, but simply permitted.

DETAILED DESCRIPTION OF THE INVENTION

The following description, given with reference to the examples produced, will clearly demonstrate the role of each of the constituents and the advantages of the novel product obtained.

EXAMPLES 1–28

The products given in these examples were prepared from the following starting ingredients:

The zircon E-MZ supplied by the company TAM and having the following average chemical composition (by weight): $ZrO_2+HfO_2$: 66%, $SiO_2$: 33%, $Al_2O_3$: 0.3%, $P_2O_5$: 0.3%, $Y_2O_3$: 0.1%, $TiO_2$: 0.1% and less than 0.2% of other compounds such as $Fe_2O_3$. The particles have an average diameter of 4.7 μm.

Zirconia sold by the Applicant under the name zirconia CC10, the average particle size of which is 3.5 μm and the average chemical composition (by weight) of which is: $ZrO_2+HfO_2$: 99%, $SiO_2$: 0.5%, $Na_2O$: 0.2%, $Al_2O_3$: 0.1% and $TiO_2$: 0.1%.

Yttriated zirconia supplied by the Applicant and having the following average chemical composition (by weight): $ZrO_2+HfO_2$: 94%, $Y_2O_3$: 5%, $Al_2O_3$: 0.6%, $TiO_2$: 0.1% and less than 0.2% of other compounds. The particles have an average diameter of 10 μm.

The silica present in the final sintered material is provided by the dissociation of the zircon, but, optionally, additional fume silica could be added to the batch.

The yttrium oxide either comes from zirconia partially stabilized with yttrium oxide, or from yttrium oxide added to the composition.

The yttrium oxide particles added to the composition have an average diameter of 3 to 4 μm.

Pigment-grade titania containing approximately 98% $TiO_2$ with an average particle size of 0.3 μm.

Alumina having an average particle size of approximately 3 μm.

It is known from those skilled in the art that metal or carbon compounds cause "bubbling" in contact with molten glass and must therefore be avoided.

The examples presented were obtained by isostatic pressing. Other techniques, such as slipcasting or vibrocasting, could be used. The blocks produced are cylinders 200 mm in diameter and 200 mm in height, the mass of which varies between 28 and 33 kg. Usual sintering conditions were used, i.e. firing at about 1600° C. for 20 hours. For a few compositions, we also produced very large blocks (76 cm×25 cm×20 cm) weighing approximately 200 kg. The chemical analysis of the various blocks produced is given in Table 1. The bulk density of the products manufactured varied between 4.7 and 5.2 g/cm³.

Table 1 summarizes the compositions of the batch and of the final sintered material of various blocks produced according to the invention (Examples 9–25 and 27–28) or outside the invention (Examples 1–8 and 26). Table 1 also mentions whether the block obtained is cracked or not and, when it was determined, the porosity of the sintered material obtained. The term "crack" should be understood here to mean a fissure having a width of more than 0.1 mm.

Examples 2 to 6 show that, in the case of materials produced from a batch in which zircon is not a predominant starting ingredient, it is not possible to obtain large crack-free blocks using only titanium dioxide as the sintering agent.

Examples 7 to 28, compared with Examples 2 to 6, show that the introduction of yttrium oxide allows large blocks to be obtained without cracks appearing when they are fired.

In addition, comparing Examples 11 and 17, 12 and 18 or 22 and 23 shows that, in the case of products containing silica and titanium and yttrium oxides, the addition of alumina allows an even higher sintering level to be achieved. This results in a reduced open porosity, even for low contents of added alumina. We therefore prefer products containing more than 0.5% alumina.

Moreover, we have found that it is necessary to have materials containing at least 0.4% yttrium oxide in order to allow large blocks to be produced without cracking in the case of zircon/zirconia batches in which zircon is not the predominant material. Moreover, the amount of yttrium oxide must not exceed 5% by weight for fear of the electrical resistance of the material dropping dramatically, which, for use as a furnace bottom, would result in the electrical energy provided by the electrodes in the furnace bottom being greatly dissipated in the blocks.

Glass corrosion was measured in a test consisting in rotating specimens (22 mm in diameter and 100 mm in height) immersed in a bath of molten glass. The speed of rotation of the specimens is 6 revolutions per minute, the glass is a glass for reinforcing fibres heated to 1450° C. and the test lasts 72 hours. At the end of this period, the corroded volume is measured for each specimen. The corroded volume of a specimen from the commercially available reference product (Example 1) is chosen as the reference. The ratio of this corroded volume to that of any other specimen multiplied by 100 gives the rating of the specimen relative to the reference. Thus, ratings greater than 100 represent less corrosion loss than in the standard chosen.

The glass corrosion resistance of the materials of the invention is greater than that of the commercial products thanks to the increase of the zirconia content above values that may currently be found in commercially available products such as ZS-1300 from Corhart, which, from chemical analysis, contains 65.9% zirconia and 32.1% silica (the starting composition essentially comprises zircon and a small amount of silica). This ZS-1300 product corresponds to Example 1.

The results of the corrosion test are given in Table 2; Ic denotes the corrosion index defined above.

It is observed that the materials of the invention have a markedly higher corrosion index than that of the reference product 1. The corrosion resistance is regarded as being significantly improved when the corrosion index is 20% greater than that of the reference material 1. This is achieved in the case of materials produced from a batch containing at most 40% zircon and a $ZrO_2+HfO_2$ content of the final sintered material greater than 82% by weight. Moreover, it is estimated that the batch must contain at least 5% zircon and a $ZrO_2+HfO_2$ content not exceeding 96% by weight since, beyond these limits, the materials obtained do not provide any particular advantage from the standpoint of corrosion resistance, as shown by comparing Example 24 and 26.

Moreover, comparing Examples 14, 15 and 24 shows that, in order to improve the corrosion resistance, it is preferable to decrease the porosity by varying the percentages of the minor constituents rather than by adding more zirconia and less zircon.

The examples demonstrate the feasibility of large blocks with more than 40% zircon (Examples 7 and 8), but these do not meet all the required criteria. This is because such blocks do not have a corrosion resistance sufficiently improved over the reference material 1 and therefore are not of any particular interest.

Furthermore, silica and the glassy phase that it generates play an important role in the feasibility of large blocks. Thus, a minimum amount of glassy phase is necessary in order to obtain crack-free blocks. The silica comes from the dissociation of zircon $ZrSiO_4$ and, optionally, from intentional addition (for example, fume silica). For reasons of homogeneity of the various components, particularly with regard to particle size distribution, compositions in which the silica comes essentially from zircon are preferred. What is more, it is less expensive to use zircon than zirconia. The starting charge comprises at least 5% by weight of zircon, which corresponds to a minimum silica content of 1.7% by weight. Moreover, the maximum proportion of 40% zircon corresponds to a maximum silica content of 14% by weight in the final sintered material.

Another important criterion in the case of the refractory blocks used in glass furnaces is the possibility of properly sealing the joints between two adjacent blocks.

For this purpose it is necessary, on the curve of expansion as a function of temperature, for the difference Δl between the maximum value of the expansion of the block and the value of this expansion at the service temperature to be as small as possible. This service temperature is approximately 1500° C. in the case of blocks placed in the tank of furnaces and from 1250 to 1350° C. in the case of feeders for moltenglass.

A study was made of the variations in Δl in the case of Examples 16 to 20 and 27. The results are given in Table 3.

Comparing Examples 16, 17 and 27 shows that the joints become less and less well sealed as the alumina content increases.

In addition, it is known from those skilled in the art that blocks having high alumina contents that are used in contact with glass for reinforcing fibres result in stoning. Moreover, high alumina contents lead to an excessive amount of glassy phase and therefore to greater corrosion sensitivity. It is therefore important to limit the alumina content. For all these reasons, it is estimated that the maximum permissible alumina content is 2.5%. Furthermore, because of the fact that the starting materials are always impure, it is not possible, in practice, to go below 0.2% by weight of $Al_2O_3$ in the final sintered material.

As regards the influence of yttrium oxide, Examples 18 to 20 show that increasing proportions of this constituent tend to reduce Δl and that, by optimizing the yttrium oxide content, it is possible to ensure that the joints between blocks for furnace tanks or for feeders are sealed, this being particularly important in the case of fluid glasses, such as glass for reinforcing fibres.

It should be noted that the main role of the yttrium oxide is not to completely stabilize the zirconia. In fact, it is introduced in an amount too low for the zirconia to be stabilized in cubic form. X-ray diffraction analysis shows, in fact, that the main phases consist of monoclinic zirconia and tetragonal zirconia, but that zirconia in cubic form cannot be detected.

Studies carried out using an electron microprobe allow us to believe that yttrium oxide plays an important role in the feasibility of the products by participating in the glassy phase.

Moreover, it is worth pointing out that, for a given zirconia content, the addition of yttrium oxide does not have a deleterious effect on the corrosion resistance, as Examples 14 and 15 show.

The function of the titanium dioxide is to promote the sintering of the zircon and probably of the zirconia. It is therefore conducive to obtaining a low-porosity material. There must be at least 0.2% $TiO_2$ by weight since, below this value, its action becomes insignificant. However, the sintered material must not contain more than 3% $TiO_2$ by weight, since the feasibility of the blocks would be affected (cracks appear).

TABLE 1

Composition by weight of the batch

| No. | Zircon (%) | Zirconia (%) | Zirconia with S% Y2O3 (%) | TiO2 (%) | Al2O3 (%) | T2O3 (%) |
|---|---|---|---|---|---|---|
| 1 | | | | | | |
| 2 | 49.0 | 50.0 | / | 1.0 | / | / |
| 3 | 38.0 | 61.0 | / | 1.0 | / | / |
| 4 | 28.5 | 70.5 | / | 1.0 | / | / |
| 5 | 16.5 | 83.0 | / | 0.5 | / | / |
| 6 | 5.5 | 94.0 | / | 0.5 | / | / |
| 7 | 70.0 | 15.0 | 14.0 | 1.0 | / | / |
| 8 | 48.0 | 20.0 | 30.0 | 2.0 | / | / |
| 9 | 38.0 | 30.5 | 30.5 | 1.0 | / | / |
| 10 | 29.0 | 40.0 | 30.0 | 1.0 | / | / |
| 11 | 16.5 | 73.0 | 10.0 | 0.5 | / | / |
| 12 | 16.5 | 63.0 | 20.0 | 0.5 | / | / |
| 13 | 16.5 | 53.0 | 30.0 | 0.5 | / | / |
| 14 | 16.0 | 81.7 | / | 0.7 | 0.6 | 1.0 |
| 15 | 15.0 | 81.9 | / | 0.5 | 0.6 | 2.0 |
| 16 | 16.6 | 81.8 | / | 0.5 | 0.6 | 0.5 |
| 17 | 16.2 | 81.8 | / | 0.5 | 1.0 | 0.5 |
| 18 | 16.2 | 81.8 | / | 0.5 | 0.5 | 1.0 |
| 19 | 15.2 | 81.8 | / | 0.5 | 0.5 | 2.0 |
| 20 | 14.2 | 81.8 | / | 0.5 | 0.5 | 3.0 |
| 21 | 16.5 | 50.0 | 30.0 | 0.5 | / | 2.7 |
| 22 | 10.0 | 59.6 | 30.0 | 0.4 | / | / |
| 23 | 10.0 | 59.0 | 30.0 | 0.4 | 0.6 | / |
| 24 | 5.0 | 64.6 | 30.0 | 0.2 | / | / |
| 25 | 5.0 | 62.0 | 30.0 | 0.2 | / | 2.7 |
| 26 | / | 69.0 | 30.0 | 1.0 | / | / |
| 27 | 15.6 | 81.8 | / | 0.5 | 1.6 | 0.5 |
| 28 | 5.0 | 69.4 | / | 0.5 | 0.6 | 4.5 |

Chemical analysis by weight of the material

| No. | ZrO2 + HfO2 (%) | SiO2 (%) | TiO2 (%) | Al2O3 (%) | Y2O3 (%) | Others | Cracks (%) | Porosity (%) |
|---|---|---|---|---|---|---|---|---|
| 1 | 65.9 | 32.1 | 1.2 | 0.3 | / | 0.5 | no | 0.5 |
| 2 | 81.8 | 16.4 | 1.1 | 0.2 | / | 0.5 | yes | ND |
| 3 | 85.5 | 12.8 | 1.1 | 0.2 | / | 0.4 | yes | ND |
| 4 | 88.6 | 9.8 | 1.1 | 0.2 | / | 0.2 | yes | ND |
| 5 | 93.1 | 5.9 | 0.6 | 0.1 | / | 0.3 | yes | 14.7 |
| 6 | 96.7 | 2.3 | 0.6 | 0.1 | / | 0.3 | yes | ND |
| 7 | 74.2 | 23.2 | 1.1 | 0.3 | 0.6 | 0.4 | no | ND |
| 8 | 79.7 | 15.9 | 2.1 | 0.3 | 1.5 | 0.5 | no | 8.7 |
| 9 | 83.9 | 12.7 | 1.1 | 0.3 | 1.6 | 0.4 | no | ND |
| 10 | 86.9 | 9.8 | 1.1 | 0.3 | 1.5 | 0.4 | no | 11.2 |
| 11 | 92.6 | 5.8 | 0.6 | 0.2 | 0.5 | 0.3 | no | 11 |
| 12 | 92.1 | 5.8 | 0.6 | 0.2 | 1.0 | 0.3 | no | 8.8 |
| 13 | 91.6 | 5.7 | 0.6 | 0.3 | 1.5 | 0.3 | no | 4.4 |
| 14 | 91.4 | 5.7 | 0.8 | 0.7 | 1.0 | 0.4 | no | 0.9 |
| 15 | 91.0 | 5.4 | 0.6 | 0.7 | 2.0 | 0.3 | no | 0.2 |

TABLE 1-continued

| | | | | | | | | |
|---|---|---|---|---|---|---|---|---|
| 16 | 91.9 | 5.9 | 0.6 | 0.7 | 0.5 | 0.4 | no | 1.5 |
| 17 | 91.7 | 5.8 | 0.6 | 1.1 | 0.5 | 0.3 | no | 3.4 |
| 18 | 91.7 | 5.8 | 0.6 | 0.6 | 1.0 | 0.3 | no | 0.4 |
| 19 | 91.0 | 5.4 | 0.6 | 0.6 | 2.0 | 0.4 | no | 0.2 |
| 20 | 90.4 | 5.1 | 0.6 | 0.6 | 3.0 | 0.3 | no | 0.2 |
| 21 | 88.6 | 5.7 | 0.6 | 0.3 | 4.2 | 0.6 | no | 6.2 |
| 22 | 93.8 | 3.6 | 0.5 | 0.3 | 1.5 | 0.3 | no | 6.4 |
| 23 | 93.2 | 3.6 | 0.5 | 0.9 | 1.5 | 0.3 | no | 0.7 |
| 24 | 95.7 | 2.0 | 0.3 | 0.3 | 1.5 | 0.2 | no | 10.5 |
| 25 | 92.9 | 2.0 | 0.3 | 0.3 | 4.2 | 0.3 | no | 9.0 |
| 26 | 96.5 | 0.3 | 1.1 | 0.2 | 1.5 | 0.4 | no | 8.5 |
| 27 | 91.3 | 5.6 | 0.6 | 1.7 | 0.5 | 0.3 | no | ND |
| 28 | 91.8 | 2.1 | 0.6 | 0.7 | 4.5 | 0.3 | no | ND |

ND = Not determined

TABLE 2

Composition by by weight of the batch

| No. | Zircon (%) | CC10 (%) | Zirconia with 5% Y2O3 (%) | TiO2 (%) | Al2O3 (%) | T2O3 (%) |
|---|---|---|---|---|---|---|
| 1 | | | | | | |
| 7 | 70.0 | 15.0 | 14.0 | 1.0 | / | / |
| 8 | 48.0 | 20.0 | 30.0 | 2.0 | / | / |
| 9 | 38.0 | 30.5 | 30.5 | 1.0 | / | / |
| 10 | 29.0 | 40.0 | 30.0 | 1.0 | / | / |
| 13 | 16.5 | 53.0 | 30.0 | 0.5 | / | / |
| 14 | 16.0 | 81.7 | / | 0.7 | 0.6 | 1.0 |
| 15 | 15.0 | 81.9 | / | 0.5 | 0.6 | 2.0 |
| 22 | 10.0 | 59.6 | 30.0 | 0.4 | / | / |
| 24 | 5.0 | 64.8 | 30.0 | 0.2 | / | / |
| 26 | / | 69.0 | 30.0 | 1.0 | / | / |

Chemical analysis by weight of the material

| No. | ZrO2 + HfO2 (%) | SiO2 (%) | TiO2 (%) | Al2O3 (%) | Y2O3 (%) | Others | Ic |
|---|---|---|---|---|---|---|---|
| 1 | 65.9 | 32.1 | 1.2 | 0.3 | / | 0.5 | 100 |
| 7 | 74.2 | 23.2 | 1.1 | 0.3 | 0.8 | | 111 |
| 8 | 79.7 | 15.9 | 2.1 | 0.3 | 1.5 | 0.5 | 119 |
| 9 | 83.9 | 12.7 | 1.1 | 0.3 | 1.6 | 0.4 | 122 |
| 10 | 86.9 | 9.8 | 1.1 | 0.3 | 1.5 | 0.4 | 131 |
| 13 | 91.6 | 5.7 | 0.6 | 0.3 | 1.5 | 0.3 | 150 |
| 14 | 91.4 | 5.7 | 0.8 | 0.7 | 1.0 | 0.4 | 179 |
| 15 | 91.0 | 5.4 | 0.6 | 0.7 | 2.0 | 0.3 | 178 |
| 22 | 93.8 | 3.6 | 0.5 | 0.3 | 1.5 | 0.3 | 158 |
| 24 | 95 7 | 2.0 | 0.3 | 0.3 | 1.5 | 0.2 | 162 |
| 26 | 96.5 | 0.3 | 1.1 | 0.2 | 1.5 | 0.4 | 163 |

TABLE 3

Chemical analysis by weight of the material

| No. | ZrO2 + HfO2 (%) | SiO2 (%) | TiO2 (%) | Al2O3 (%) | Y2O3 (%) | Δl (1500° C.) | Δl (1350° C.) |
|---|---|---|---|---|---|---|---|
| 16 | 91.9 | 5.9 | 0.6 | 0.7 | 0.5 | +0.43 | / |
| 17 | 91.7 | 5.8 | 0.6 | 1.1 | 0.5 | +0.6 | / |
| 18 | 91.7 | 5.8 | 0.6 | 0.6 | 1.0 | +0.28 | −0.36 |
| 19 | 91.0 | 5.4 | 0.6 | 0.6 | 2.0 | +0.97 | −0.17 |
| 20 | 90.4 | 5.1 | 0.6 | 0.6 | 3.0 | −0.07 | 0 |
| 27 | 91.3 | 5.6 | 0.6 | 1.7 | 0.5 | +0.9 | / |

EXAMPLES 29 AND 30

Although Examples 1 to 28 had been produced from fine particle-size powders, Examples 29–30 illustrate the possibility of producing sintered blocks from coarser powders. They also illustrate the possibility of recycling the blocks according to the invention as a source of zirconia.

Sintered blocks according to the invention having the following composition by mass: $ZrO_2+HfO_2$: 91%, $SiO_2$: 5.9%, $TiO_2$: 0.75%, $Y_2O_3$: 1.1%, $Al_2O_3$: 0.8%, others: 0.45%, were ground and screened in order to obtain particles of three particle-size classes, namely 2–5 mm, 0.5–2 mm and <0.5 mm. These particles were used in Example 30.

ZS-1300 from Corhart was also ground and screened in order to obtain particles of two particle-size classes, namely 0.5–2 mm and <0.5 mm. These particles were used in Example 29.

Other starting ingredients used were as follows:

fume silica supplied by the Applicant and having the following average chemical composition: $SiO_2$: 93.5%, $ZrO_2$: 2.4%, $Al_2O_3$: 3.5%, others: 0.6%; the fume silica particles have a median diameter of 0.5 μm;

zircon sand, the particles of which have an average diameter of 140 μm and the following composition: $ZrO_2+HfO_2$: 65%, $Al_2O_3$: 0.5%, $SiO_2$: 34%, others: 0.5%;

CA25 high-alumina cement from Alcoa, the analysed chemical composition of which is, by weight: CaO: 19%, $Al_2O_3$: 79%, $SiO_2$: 0.3%, others: 1.7%; and zircon, CC10 zirconia and yttrium oxide, these being like those used in Examples 1–28.

Two sintered blocks 29 and 30 were prepared from these starting materials, the compositions by weight of the batch and of the material obtained being as follows:

| | Example 29 | Example 30 |
|---|---|---|
| Compositions by weight of the batch, % | | |
| Particles, 2–5 mm | — | 10 |
| Particles, 0.5–2 mm | 12 | 25 |
| Particles, <0.5 mm | 10 | 30 |
| CC10 zirconia | 73.5 | 8 |
| Zircon sand | — | 12.4 |
| Zircon | — | 10 |
| $Y_2O_3$ | 0.5 | 0.6 |
| $SiO_2$ (fume silica) | 2 | 2 |
| CA25 cement | 2 | 2 |
| Chemical composition by weight of the sintered material, % | | |
| $ZrO_2 + HfO_2$ | 87.3 | 81.7 |
| $SiO_2$ | 9.5 | 13.4 |
| $Al_2O_3$ | 1.7 | 2.2 |
| $TiO_2$ | 0.3 | 0.5 |
| $Y_2O_3$ | 0.5 | 1.3 |

The blocks of Examples 29 and 30 were crack-free and had a porosity of 3.1 and 12%, respectively.

What is claimed is:

1. A sintered material that is produced from a batch containing 5 to 40% zircon and that has the following chemical composition in % by weight:

| | |
|---|---|
| $ZrO_2 + HfO_2$ | 82–96 |
| $SiO_2$ | 1.7–14 |
| $TiO_2$ | 0.2–3 |
| $Y_2O_3$ | 0.4–5 |
| $Al_2O_3$ | 0.2–2.5 |
| Others | <1 |

2. The sintered material according to claim 1, wherein the sintered material has the following chemical composition in % by weight:

| | |
|---|---|
| $ZrO_2 + HfO_2$ | 87–94 |
| $SiO_2$ | 3–8 |
| $TiO_2$ | 0.4–1.5 |
| $Y_2O_3$ | 0.8–3.0 |
| $Al_2O_3$ | 0.5–1.0 |
| Others | <0.5. |

3. The sintered material according to claim 1, wherein the sintered material is in the form of a block weighing at least 10 Kg.

4. The sintered material according to claim 1, wherein the sintered material is produced from a batch containing a recycled material as a source of zirconia.

5. The sintered material according to claim 1, wherein the sintered material is produced from a batch containing 10 to 20% zircon.

6. A process of making a shaped body of sintered material, which comprises the following steps:
 a) preparing a sinterable batch containing 5 to 40% by weight of zircon and comprising by weight, on the oxide basis, 82–96% of $ZrO_2+HfO_2$, 1.7–14 of $SiO_2$, 0.2–3% of $TiO_2$, 0.4–5% of $Y_2O_3$, 0.2–2.5% of $Al_2O_3$, and <1 of others;
 b) forming said batch into a green shape, and
 c) firing the resultant green shape to a temperature in the range of about 1400° C. and 1650° C. for a time sufficient to sinter the green shape.

7. The process according to claim 6, wherein the firing temperature is from 1500 to 1600° C. and the firing time is between 10 and 30 hours.

8. The process of claim 6, further comprising using the sintered material in glass furnace in order to form a tank of the furnace.

9. The process of claim 6, further comprising using the sintered material in glass furnace in order to form a glass feeder.

* * * * *